(12) United States Patent
Chen et al.

(10) Patent No.: US 8,355,587 B2
(45) Date of Patent: Jan. 15, 2013

(54) IMAGE PROCESSING APPARATUS CAPABLE OF WRITING COMPRESSED DATA INTO FRAME BUFFER AND READING BUFFERED DATA FROM FRAME BUFFER ALTERNATELY AND RELATED IMAGE PROCESSING METHOD THEREOF

(75) Inventors: Chiuan-Shian Chen, Tainan (TW); Wei-Hsien Lin, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 408 days.

(21) Appl. No.: 12/758,022

(22) Filed: Apr. 11, 2010

(65) Prior Publication Data

US 2011/0249906 A1    Oct. 13, 2011

(51) Int. Cl.
*G06K 9/36*  (2006.01)
(52) U.S. Cl. .................................................. 382/232
(58) Field of Classification Search .................. 382/166, 382/232–234, 236, 304–305; 345/502, 505; 348/394.1, 719; 375/240.12, 240.25; 386/354; 700/4, 7
See application file for complete search history.

(56) References Cited

U.S. PATENT DOCUMENTS

| | | | | | |
|---|---|---|---|---|---|
| 4,539,593 | A | * | 9/1985 | Jutier et al. | 348/719 |
| 5,212,742 | A | * | 5/1993 | Normile et al. | 382/166 |
| 5,461,679 | A | * | 10/1995 | Normile et al. | 382/304 |
| 5,828,381 | A | * | 10/1998 | Penna | 345/473 |

\* cited by examiner

*Primary Examiner* — Jose Couso
(74) *Attorney, Agent, or Firm* — Winston Hsu; Scott Margo

(57) ABSTRACT

An image processing apparatus includes a processing circuit and a storage system. The processing circuit generates a first processing result and a second processing result by processing a first horizontal line group of a first frame and a second horizontal line group of a second frame preceding the first frame, respectively. The storage system includes: a frame buffer; a write circuit for storing the first processing result into the frame buffer; a read circuit for reading the second processing result from the frame buffer; and a timing controller for controlling the write circuit to start storing the first processing result at a first time point not prior to a specific time point when the processing circuit finishes receiving the first horizontal line group, and controlling the read circuit to start reading the second processing result at a second time point which is prior to the specific time point.

20 Claims, 9 Drawing Sheets

IMAGE PROCESSING APPARATUS CAPABLE OF WRITING COMPRESSED DATA INTO FRAME BUFFER AND READING BUFFERED DATA FROM FRAME BUFFER ALTERNATELY AND RELATED IMAGE PROCESSING METHOD THEREOF

BACKGROUND

The disclosed embodiments of the present invention relate to processing an image data, and more particularly, to an image data compression apparatus capable of writing a compressed data into a frame buffer and reading a buffered data from the frame buffer alternately and related image processing method thereof.

Data compression is commonly used to reduce the amount of data stored in a storage device. Regarding an overdrive technique applied to a liquid crystal display (LCD) panel for example, it artificially boosts the response time by increasing the driving voltage used to make a liquid crystal cell change its state. The overdrive voltage of one liquid crystal cell (i.e., one pixel) is determined by a pixel value in a current frame and a pixel value in a previous frame. Therefore, an image data of the previous frame has to be recorded into a frame buffer for later use. In general, the image data of the previous frame will be compressed before stored into the frame buffer, and the compressed data of the previous frame will be read from the frame buffer and decompressed to produce a recovered image data of the previous frame. However, in a variable bit rate application, the compression bit rate of the current frame and the decompression bit rate of the previous frame are usually different, and may cause read/write overflow if only one frame buffer is employed. To solve the read/write overflow problem, an alternative conventional design proposes using two frame buffers. That is, when one of the frame buffers is recording compressed data of a current frame, the other of the frame buffers is outputting buffered compressed data of a precious frame. However, this is not a cost-effective solution due to requirement of two frame buffers.

In view of above, there is a need for an image data processing apparatus and method which can efficiently record compressed data into a frame buffer and read buffered compressed data from the frame buffer without increasing the frame buffer cost.

SUMMARY

In accordance with exemplary embodiments of the present invention, an image data compression apparatus capable of writing a compressed data into a frame buffer and reading a buffered data from the frame buffer alternately and related image processing method thereof are proposed to solve the above-mentioned problem.

According to a first aspect of the present invention, an exemplary image processing apparatus for processing a plurality of successive frames is disclosed. Each frame is divided into a plurality of horizontal line groups, and each horizontal line group has at least one horizontal line. The exemplary image processing apparatus includes a first processing circuit and a storage system. The first processing circuit is utilized for processing the horizontal line groups in each frame to generate a plurality of processing results, respectively, wherein a first processing result is generated by processing a first horizontal line group of a first frame, a second processing result is generated by processing a second horizontal line group of a second frame which precedes the first frame, and the first processing circuit receives a last horizontal line included in the first horizontal line group prior to receiving a following horizontal line having a line sequence number equal to a line sequence number of a leading horizontal line included in the second horizontal line group. The storage system includes: a frame buffer; a write circuit, coupled between the first processing circuit and the frame buffer, for buffering the first processing result and storing the first processing result into the frame buffer; a read circuit, coupled to the frame buffer, for reading the second processing result, stored into the frame buffer by the write circuit, from the frame buffer; and a timing controller, coupled to the write circuit and the read circuit, for controlling the write circuit to start storing the first processing result into the frame buffer at a first time point which is not prior to a time point when the first processing circuit finishes receiving the first horizontal line group, and controlling the read circuit to start reading the second processing result from the frame buffer at a second time point which is prior to the time point when the first processing circuit finishes receiving the first horizontal line group.

According to a second aspect of the present invention, an exemplary image processing method for processing a plurality of successive frames is disclosed. Each frame is divided into a plurality of horizontal line groups, and each horizontal line group has at least one horizontal line. The exemplary image processing method includes: performing a data processing operation upon the horizontal line groups in each frame to generate a plurality of processing results, respectively, wherein a first processing result is generated by processing a first horizontal line group of a first frame, a second processing result is generated by processing a second horizontal line group of a second frame which precedes the first frame, and the data processing operation receives a last horizontal line included in the first horizontal line group prior to receiving a following horizontal line having a line sequence number equal to a line sequence number of a leading horizontal line included in the second horizontal line group; storing the second processing result into a frame buffer; reading the second processing result from the frame buffer at a second time point which is prior to a time point when the data processing operation finishes receiving the first horizontal line group; and buffering the first processing result and storing the first processing result into the frame buffer, wherein storing the first processing result into the frame buffer is started at a first time point which is not prior to the time point when the data processing operation finishes receiving the first horizontal line group.

According to a third aspect of the present invention, an exemplary image processing apparatus for processing a plurality of successive frames is disclosed. Each frame is divided into a plurality of horizontal line groups, and each horizontal line group has at least one horizontal line. The exemplary image processing apparatus includes a first processing circuit and a storage system. The first processing circuit is utilized for processing the horizontal line groups in each frame to generate a plurality of processing results, respectively, wherein a first processing result is generated by processing a first horizontal line group of a first frame, a second processing result is generated by processing a second horizontal line group of a second frame which precedes the first frame, and a line sequence number of a leading horizontal line included in the first horizontal line group is identical to a line sequence number of a leading horizontal line included in the second horizontal line group. The storage system includes: a frame buffer; a write circuit, coupled between the first processing circuit and the frame buffer, for buffering the first processing result and storing the first processing result into the frame buffer; a read circuit, coupled to the frame buffer, for reading the second processing result, stored into the frame buffer by the write circuit, from the frame buffer; and a timing controller, coupled to the write circuit and the read circuit, for controlling the write circuit to start storing the first processing result into the frame buffer at a first time point which is not prior to a time point when the first processing circuit finishes receiving the first horizontal line group, and controlling the read circuit to start reading the second processing result from the frame buffer at a second time point which is prior to a time point when the first processing circuit starts receiving the first horizontal line group.

According to a fourth aspect of the present invention, an exemplary image processing method for processing a plurality of successive frames is disclosed. Each frame is divided into a plurality of horizontal line groups, and each horizontal line group has at least one horizontal line. The exemplary image processing method includes: performing a data processing operation upon the horizontal line groups in each frame to generate a plurality of processing results, respectively, wherein a first processing result is generated by processing a first horizontal line group of a first frame, a second processing result is generated by processing a second horizontal line group of a second frame which precedes the first frame, and a line sequence number of a leading horizontal line included in the first horizontal line group is identical to a line sequence number of a leading horizontal line included in the second horizontal line group; storing the second processing result into a frame buffer; reading the second processing result from the frame buffer at a second time point which is prior to a time point when the data processing operation starts receiving the first horizontal line group; and buffering the first processing result and storing the first processing result into the frame buffer, wherein storing the first processing result into the frame buffer is started at a first time point which is not prior to a time point when the data processing operation finishes receiving the first horizontal line group.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The conception of the present invention is to write a compressed data of a current frame into a frame buffer and read a buffered compressed data of a previous frame from the frame buffer, alternately. As there is only one frame buffer employed for buffering compressed image data, the frame buffer can be implemented by cheap memory chip(s). Thus, the desired buffering performance of the compressed image data may be retained without any increase of the frame buffer cost. More specifically, with a proper timing control of the write operation and the read operation applied to a single frame buffer employed in a particular application (e.g., an overdrive application), the undesired read/write overflow can be avoided or mitigated. Further details will be described as follows.

Figure 1:
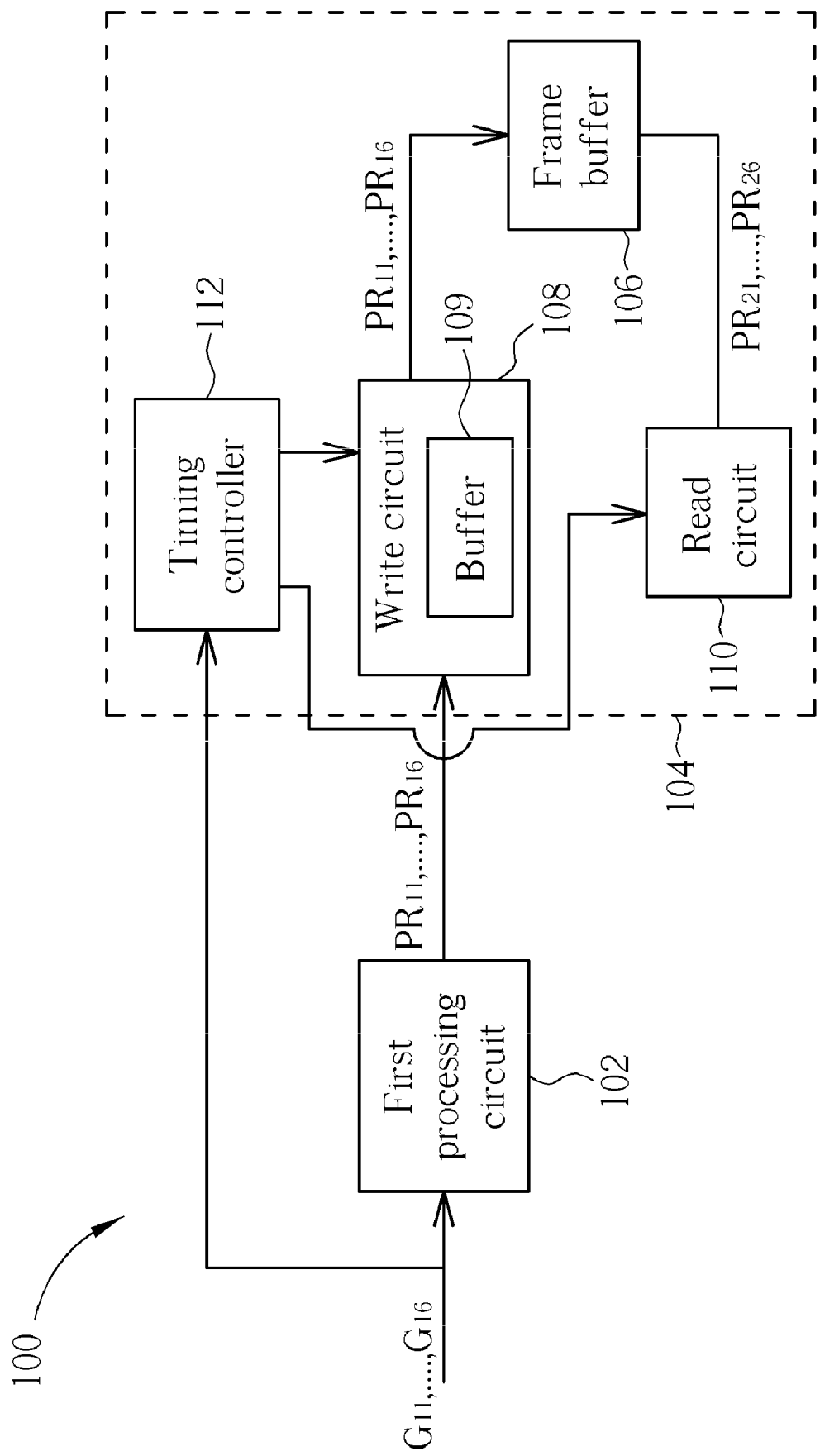
FIG. 1 is a block diagram illustrating a first exemplary embodiment of an image processing apparatus according to the present invention.
Figure 2:
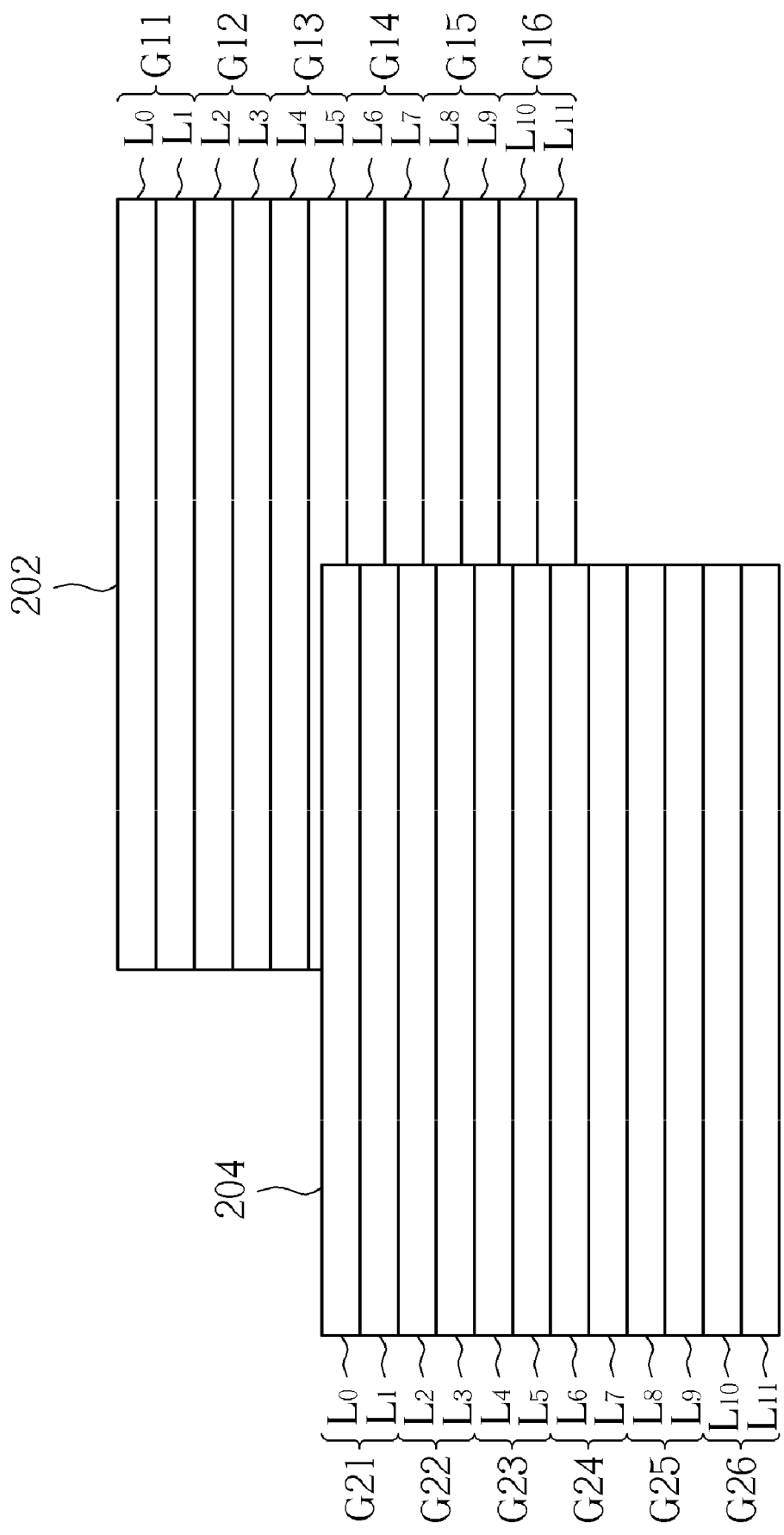
FIG. 2 is a diagram illustrating a first frame and a second frame preceding the first frame.

Please refer to FIG. 1, which is a block diagram illustrating a first exemplary embodiment of an image processing apparatus according to the present invention. In this exemplary embodiment, the image processing apparatus 100 includes a first processing circuit 102 and a storage system 104, where the storage system 104 includes, but is not limited to, a frame buffer 106, a write circuit 108, a read circuit 110, and a timing controller 112. The image processing apparatus 100 is utilized for processing a plurality of successive frames (i.e., temporally adjacent frames). Each frame is divided into a plurality of horizontal line groups, and each horizontal line group may have one or more horizontal lines according to actual design consideration. In FIG. 2, a first frame 202 and a second frame 204 preceding the first frame 202 are presented for illustrative purposes. By way of example, but not limitation, the first frame 202 is a current frame with partial data currently processed by the first processing circuit 102, and the second frame 204 is a previous frame with all data already processed by the first processing circuit 102. As shown in the example of FIG. 2, each frame is divided into six horizontal line groups G11-G16/G21-G26 each having two horizontal lines. Taking the horizontal line group G13 of the first frame 202 for example, it contains horizontal lines indexed by the line sequence numbers $L_4$ and $L_5$. As the horizontal line group G23 of the second frame 204 and the horizontal line group G13 of the first frame 202 are located at the same position within a frame (i.e., the horizontal line groups G13 and G23 are co-located in different frames 202 and 204), the horizontal line group G23 of the second frame 204 will contain horizontal lines indexed by the same line sequence numbers $L_4$ and $L_5$. It should be noted that the number of horizontal line groups per frame and the number of horizontal lines per horizontal line group are for illustrative purposes only. For example, in a generalized design, each horizontal line group includes N horizontal lines, where N may be any positive integer.

The first processing circuit 102 processes the horizontal line groups in each frame to generate a plurality of processing results, respectively. Therefore, a first processing result is generated by processing a first horizontal line group of a first frame, and a second processing result is generated by processing a second horizontal line group of a second frame which precedes the first frame. For example, first processing results $PR_{11}, \ldots, PR_{16}$ are sequentially generated by processing first horizontal line groups of the first frame (e.g., the horizontal line groups $G11, \ldots, G16$ of the first frame 202 shown in FIG. 2), and second processing results $PR_{21}, \ldots, PR_{26}$ are sequentially generated by processing second horizontal line groups of the second frame (e.g., the horizontal line groups $G21, \ldots, G26$ of the second frame 204 shown in FIG. 2). Therefore, as the first processing circuit 102 processes the horizontal line groups in the successive frames sequentially, the first processing circuit 102 receives a last horizontal line included in a first horizontal line group (e.g., the horizontal line indexed by the line sequence number $L_1$ in the horizontal line group G11) prior to receiving a following horizontal line having a line sequence number equal to a line sequence number of a leading horizontal line included in a second horizontal line group (e.g., the horizontal line indexed by the line sequence number $L_2$ in the horizontal line group G22).

Regarding the storage system 104, the write circuit 108 is coupled between the first processing circuit 102 and the frame buffer 106, and serves as a write interface for storing each processing result generated from the first processing circuit 102 into the frame buffer 106. For example, in this exemplary embodiment, the write circuit 108 has a buffer 109 implemented therein for buffering the first processing results $PR_{11}, \ldots, PR_{16}$ one by one, and then stores the buffered first processing results $PR_{11}, \ldots, PR_{16}$ into the frame buffer 106 one by one. The read circuit 110 is coupled to the frame buffer 106, and serves as a read interface for reading each buffered processing result that is stored into the frame buffer 106 by the write circuit 108. For example, the read circuit 110 reads each of the second processing results $PR_{21}, \ldots, PR_{26}$, previously stored into the frame buffer 106 by the write circuit 108, from the frame buffer 106.

The timing controller 112 is coupled to the write circuit 108 and the read circuit 110, and utilized for controlling write timings and read timings. For example, the timing controller 112 controls the write circuit 108 to start storing a first processing result (e.g., $PR_{11}$) into the frame buffer 106 at a first time point which is not prior to a time point when the first processing circuit 102 finishes receiving the first horizontal line group (e.g., G11); in addition, the timing controller 112 controls the read circuit 110 to start reading a second processing result (e.g., $PR_{22}$) from the frame buffer 106 at a second time point which is prior to the time point when the first processing circuit 102 finishes receiving the first horizontal line group (e.g., G11). In one exemplary design, the first time point is the time point when the first processing circuit 102 finishes receiving the first horizontal line group, and the second time point is a time point when the first processing circuit finishes receiving half of the first horizontal line group. However, this is for illustrative purposes only, and is not meant to be a limitation on the present invention.

Figure 3:
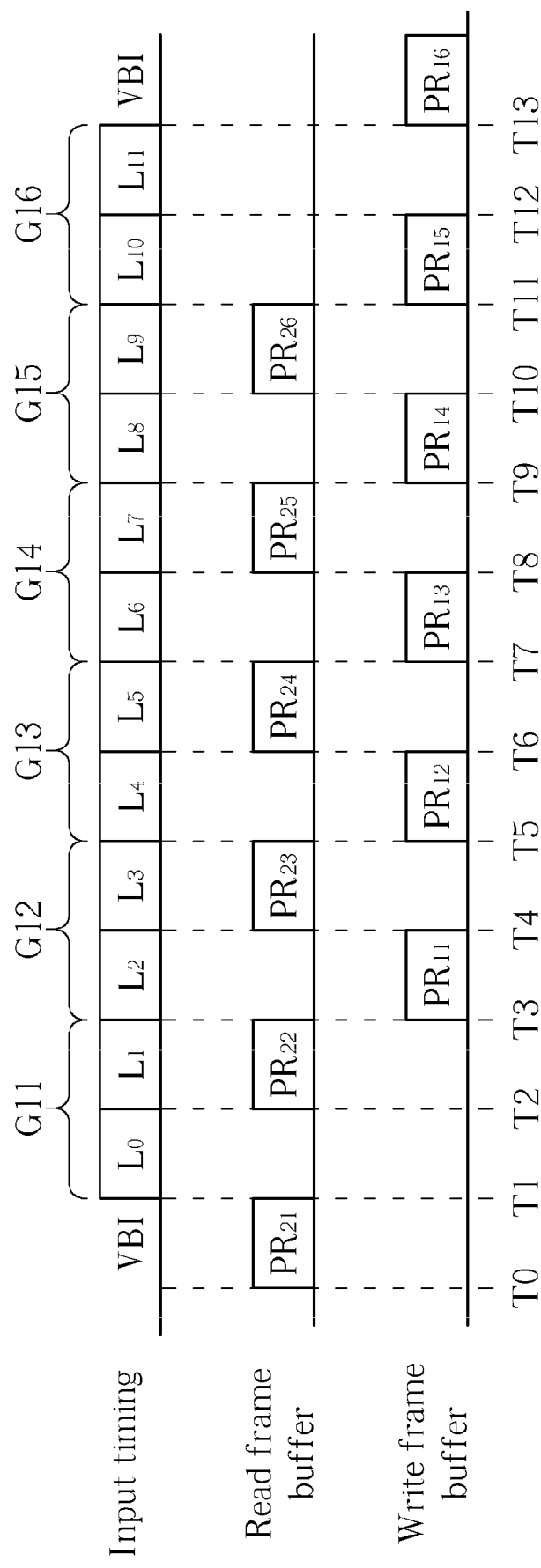
FIG. 3 is a timing diagram of write operations and read operations respectively performed by a write circuit and a read circuit shown in FIG. 1.

Please refer to FIG. 2 in conjunction with FIG. 3. FIG. 3 is a timing diagram of write operations and read operations respectively performed by the write circuit 108 and the read circuit 110 shown in FIG. 1. As shown in FIG. 3, one vertical blanking interval (VBI) immediately precedes the leading horizontal line indexed by the line sequence number $L_0$, and another VBI immediately follows the last horizontal line indexed by the line sequence number $L_{11}$. The timing controller 112 alternately controls the write circuit 108 to write a processing result of a current frame (e.g., each of the first processing results $PR_{11}, \ldots, PR_{15}$) into the frame buffer 106 and the read circuit 110 to read a buffered processing result of a previous frame (e.g., each of second processing results $PR_{22}, \ldots, PR_{26}$) from the frame buffer 106, thereby avoiding or mitigating the undesired read/write overflow. For example, before the first processing circuit 102 finishes receiving a first horizontal line group of a current frame, the write circuit 108 buffers any data of a first processing result of the first horizontal line group of the current frame into the buffer 109, and the read circuit 110 is enabled to read a second processing result of a second horizontal line group of a previous frame from the frame buffer 106. After the first processing circuit 102 finishes receiving the first horizontal line group of the current frame, the second processing result has been read from the frame buffer 106; besides, the first processing result has been obtained and buffered in the buffer 109 of the write circuit 108. Therefore, the write circuit 108 is enabled to start storing the first processing result into the frame buffer 106. As shown in FIG. 3, the read circuit 110 starts reading the second processing result $PR_{22}$ at time point T2 before the write circuit 108 starts storing the first processing result $PR_{11}$ at time point T3; the read circuit 110 starts reading the second processing result $PR_{23}$ at time point T4 before the write circuit 108 starts storing the first processing result $PR_{12}$ at time point T5; the read circuit 110 starts reading the second processing result $PR_{24}$ at time point T6 before the write circuit 108 starts storing the first processing result $PR_{13}$ at time point T7; the read circuit 110 starts reading the second processing result $PR_{25}$ at time point T8 before the write circuit 108 starts storing the first processing result $PR_{14}$ at time point T9; and the read circuit 110 starts reading the second processing result $PR_{26}$ at time T10 before the write circuit 108 starts storing the first processing result $PR_{15}$ at time T11. It should be noted that each interval between a read time point and an adjacent write time point, as shown in FIG. 3, is equal to a time period required for receiving half of a horizontal line group (e.g., one horizontal line in this exemplary embodiment).

Moreover, regarding a first processing result of a first horizontal line group in a current frame, where a line sequence number of a leading horizontal line included in the first horizontal line group is identical to a line sequence number of a leading horizontal line included in a second horizontal line group of a previous frame, the timing controller 112 controls the write circuit 108 to start storing the first processing result into the frame buffer 106 at one time point which is not prior to a time point when the first processing circuit 102 finishes receiving the first horizontal line group, and controls the read circuit 110 to start reading the second processing result from the frame buffer 106 at another which is prior to a time point when the first processing circuit starts receiving the first horizontal line group. As shown in FIG. 3, the read circuit 110 starts reading the second processing result $PR_{21}$ at time point T0 before the first processing circuit 102 starts receiving the first horizontal line group G11 at time point T1, and the write circuit 108 starts storing the first processing result $PR_{11}$ when the first processing circuit 102 finishes receiving the first horizontal line group G11 at time point T3; the read circuit 110 starts reading the second processing result $PR_{22}$ at time point T2 before the first processing circuit 102 starts receiving the first horizontal line group G12 at time point T3, and the write circuit 108 starts storing the first processing result $PR_{12}$ when the first processing circuit 102 finishes receiving the first horizontal line group G12 at time point T5; and so forth. To put it in another way, an interval between a read time point for a processing result of a horizontal line group located at a specific position in a previous frame and a write time point for a processing result of a horizontal line group located at the same specific position in a current frame is not less than a time period required for receiving one horizontal line group.

Preferably, the timing controller 112 controls the operational timings of the write circuit 108 and the read circuit 110 to prevent write operation of writing a processing result into the frame buffer 106 from being enabled while a read operation of reading a processing result from the frame buffer 106 is still active. In this way, as the write circuit 108 and the read circuit 110 do not access the frame buffer 106 at the same time, the bandwidth requirement of the frame buffer 106 can be reduced.

Figure 4:
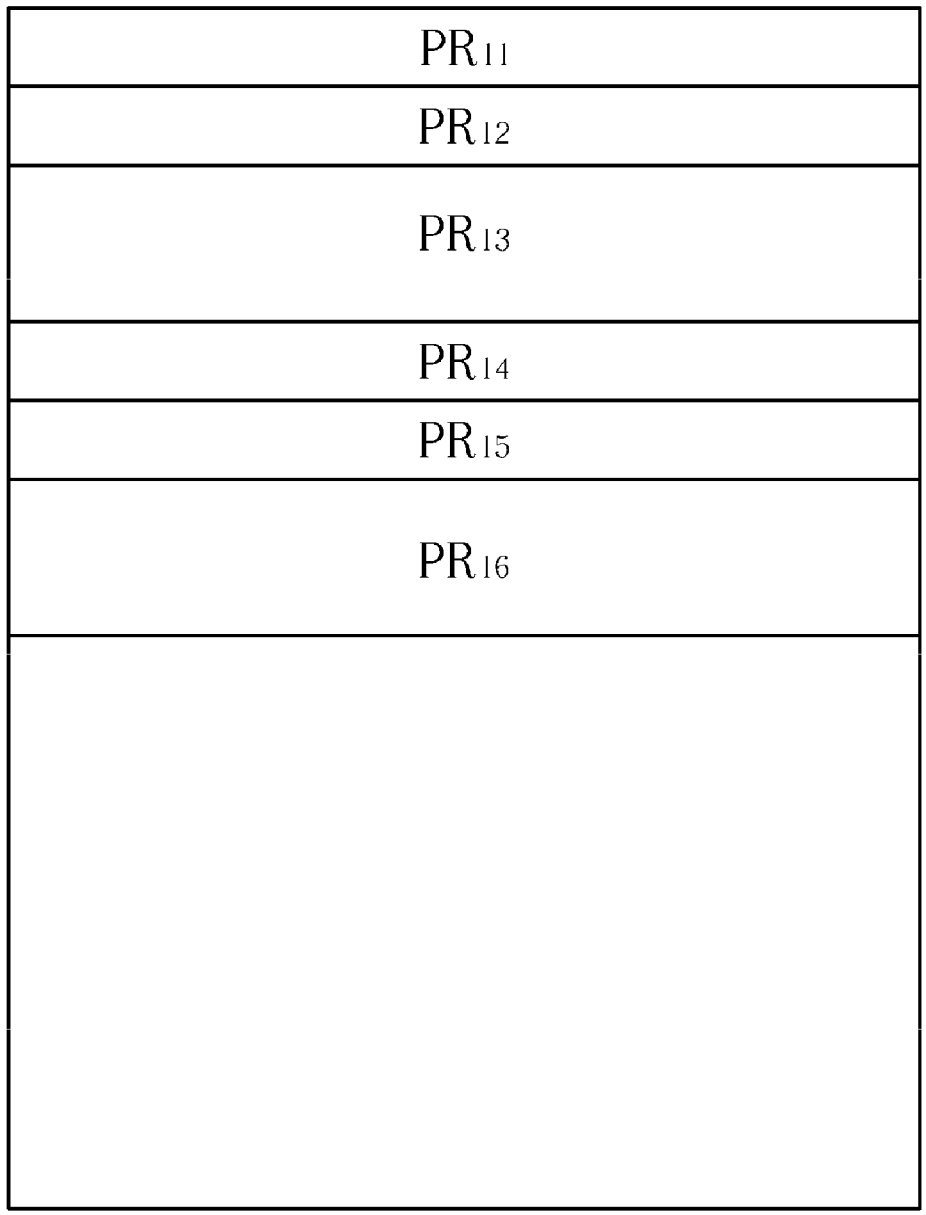
FIG. 4 is a diagram illustrating one exemplary frame buffer design of a frame buffer shown in FIG. 1.
Figure 5:
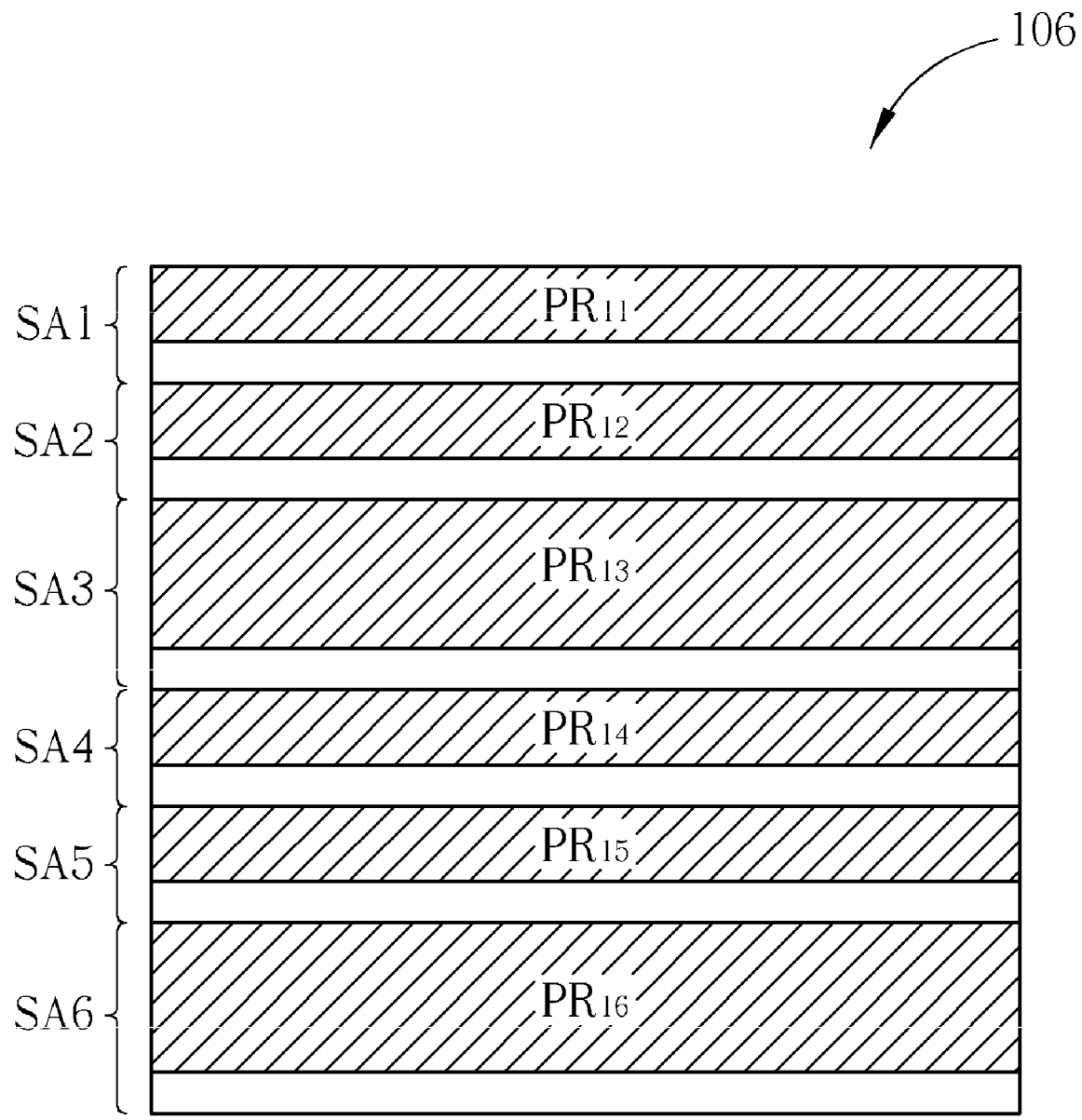
FIG. 5 is a diagram illustrating another exemplary frame buffer design of the frame buffer shown in FIG. 1.

Considering one exemplary frame buffer design, the write circuit 108 may sequentially write processing results generated from the first processing circuit 102 into continuous physical addresses of the frame buffer 106. For example, as shown in FIG. 4, first processing results $PR_{11}, \ldots, PR_{16}$ of horizontal line groups $G11, \ldots, G16$ in the first frame 202 are stored in the frame buffer 106 one by one, where the physical addresses of the storage areas occupied by the first processing results $PR_{11}, \ldots, PR_{16}$ are continuous. In an alternative frame buffer design of the present invention, a storage space of the frame buffer 106 is divided into a plurality of predetermined storage areas, where a total number of the predetermined storage areas is equal to a total number of the horizontal line groups in each frame. More specifically, predetermined storage areas are dedicated to storing processing results of corresponding horizontal line groups in each frame. The write circuit 108 is therefore configured to store processing results of the horizontal line groups in each frame into the predetermined storage areas, respectively. For example, in a case where each frame has six horizontal line groups, the storage space of the frame buffer 106 is divided into six predetermined storage areas SA1-SA6, as shown in FIG. 5. It should be noted that sizes of the predetermined storage areas SA1-SA6 are not required to be the same. For example, the size of a predetermined storage area dedicated to buffering a processing result of a particular horizontal line group in each frame may be set according to an estimated maximum data size of the processing result generated from the first processing circuit 102. As can be seen from FIG. 5, the first processing results $PR_{11}, \ldots, PR_{16}$ of horizontal line groups $G11, \ldots, G16$ in the first frame 202 are required to be stored in the respective predetermined storage areas SA1-SA6. Thus, the physical addresses of the storage areas occupied by the first processing results $PR_{11}, \ldots, PR_{16}$ are not necessarily continuous. In other words, there may be a free space between two adjacent processing results stored in the frame buffer 106. Therefore, such a frame buffer configuration can further help to avoid the undesired read/write overflow.

Figure 6:
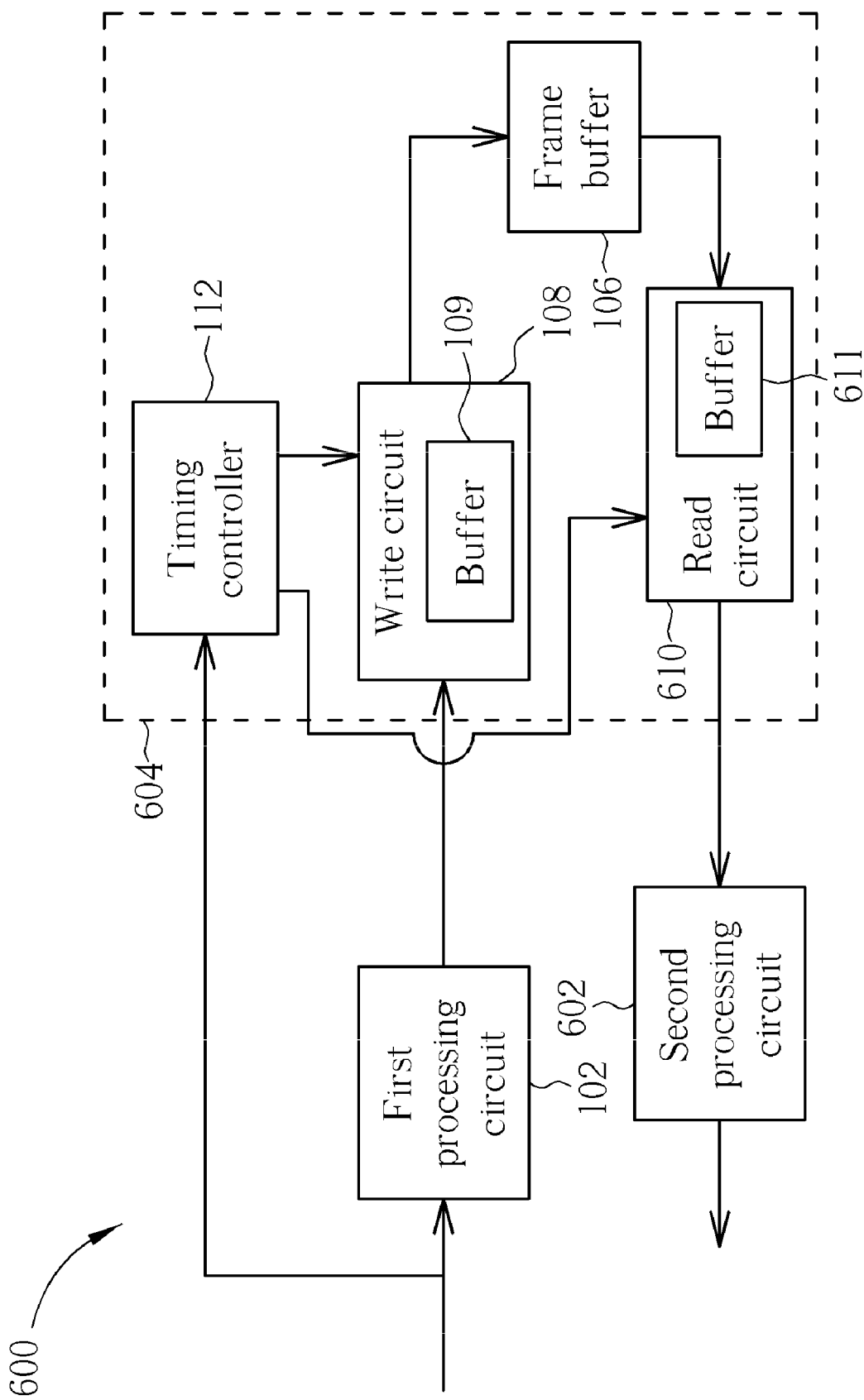
FIG. 6 is a block diagram illustrating a second exemplary embodiment of an image processing apparatus according to the present invention.

In above exemplary embodiment shown in FIG. 1, the read circuit 110 may provide the processing results read from the frame buffer 106 to another processing circuit for further data processing. FIG. 6 is a block diagram illustrating a second exemplary embodiment of an image processing apparatus according to the present invention. In this exemplary embodiment, the image processing apparatus 600 includes the aforementioned first processing circuit 102, a second processing circuit 606, and a storage system 604, where the storage system 604 includes the above-mentioned frame buffer 106, write circuit 108 and timing controller 112, and a read circuit 610 having a buffer 611 implemented therein. The operation of the read circuit 610 is similar to that of the read circuit 110, and the major difference therebetween is that the read circuit 610 has data buffering capability for temporarily storing a buffered processing result read from the frame buffer 106 and then outputs the temporarily stored processing result to the following second processing circuit 602 at a proper timing. As a person skilled in the art can readily understand operations of the storage system 604 after reading above paragraphs directed to the storage system 104 shown in FIG. 1, further description is omitted here for brevity.

The second processing circuit 602 is coupled to the read circuit 610, and utilized for performing an inverse data processing operation corresponding to a data processing operation performed by the first processing circuit 102. By way of example, but not limitation, the first processing circuit 102 may be a compression circuit/encoding circuit/encrypting circuit, and the second processing circuit 602 may be a decompression circuit/decoding circuit/decrypting circuit. In a case where the first processing circuit is a compression circuit and the second processing circuit is a decompression circuit, the image processing apparatus may be employed in an overdrive application for an LCD panel.

Figure 7:
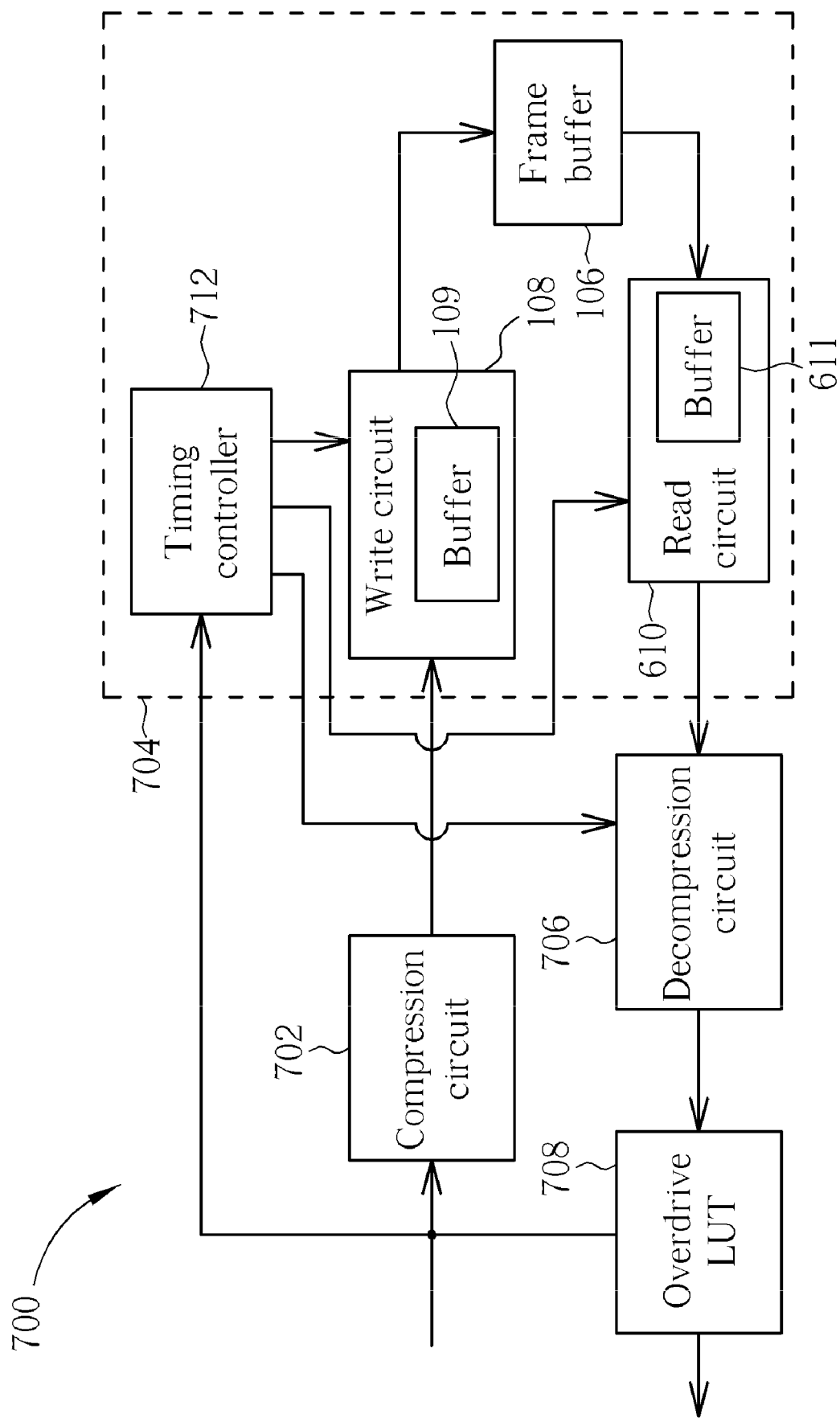
FIG. 7 is a block diagram illustrating a third exemplary embodiment of an image processing apparatus according to the present invention.

Please refer to FIG. 7, which is a block diagram illustrating a third exemplary embodiment of an image processing apparatus according to the present invention. In this exemplary embodiment, the image processing apparatus 700 includes, but is not limited to, a compression circuit 702, a storage system 704, a decompression circuit 706, and an overdrive lookup table (LUT) 708, where the storage system 704 includes a timing controller 712 and the above-mentioned frame buffer 106, write circuit 108 and read circuit 610. The operation of the timing controller 712 is similar to that of the timing controller 112, and the major different therebetween is that the timing controller 712 further controls operational timings of the decompression circuit 706. As shown in FIG. 7, the compression circuit 702 is implemented to compress horizontal line groups in each frame to generate processing results (i.e., compression results), respectively. The storage system 704 therefore stores each compression result of a current frame into the frame buffer 106 and read each compression result of a previous frame from the frame buffer 106, alternately. After receiving a compression result of a horizontal line group in the previous frame from the read circuit 610, the decompression circuit 706 decompresses the compression result to generate a recovered horizontal line group of the previous frame. With a proper timing control applied to the decompression circuit 706, the recovered horizontal line group of the previous frame is fed into the overdrive LUT 708 when an incoming horizontal line group of the current frame is received by the image processing apparatus 700, where the recovered horizontal line group of the previous frame and the incoming horizontal line group of the current frame correspond to the same position in a frame (i.e., the recovered horizontal line group and the incoming horizontal line group are co-located in different frames). For example, the recovered horizontal line group is derived from decompressing a compression result of the horizontal line group G22 of the second frame 204 shown in FIG. 2, and the incoming horizontal line group of the current frame is the horizontal line group G12 of the first frame 202 shown in FIG. 2. Next, the overdrive LUT 708 determines overdrive voltages of pixels within the incoming horizontal line group of the current frame according to pixel information provided by the recovered horizontal line group of the previous frame and the incoming horizontal line group of the current frame.

The exemplary image processing apparatus may be employed in an overdrive application of an LCD panel for storing compressed image data of a previous frame, thereby reducing the buffer size of a frame buffer. However, any application which employs one of the exemplary image processing apparatuses 100, 600, and 700 falls within the scope of the present invention.

Figure 8:
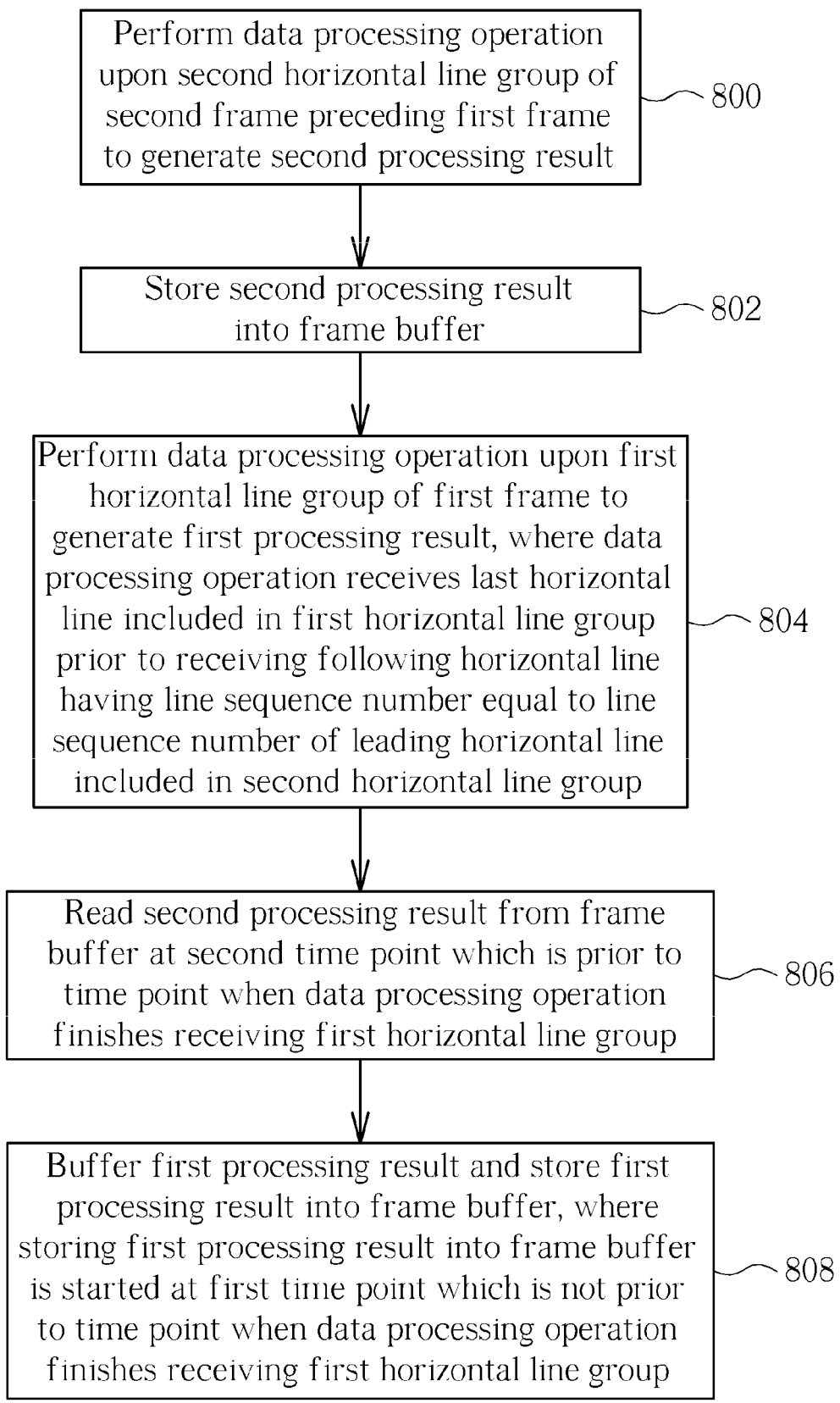
FIG. 8 is a flowchart illustrating one generalized image processing method according to the present invention.

FIG. 8 is a flowchart illustrating one generalized image processing method according to the present invention. The generalized image processing method may be employed by the image data compression apparatuses 100, 600, and 700. Provided that the result is substantially the same, the steps are not required to be executed in the exact order shown in FIG. 8. The exemplary image processing method can be summarized as follows:

Step 800: Perform a data processing operation (e.g., a compression operation) upon a second horizontal line group of a second frame to generate a second processing result, where the second frame (e.g., a previous frame) precedes a first frame (e.g., a current frame).

Step 802: Store the second processing result into a frame buffer. In one exemplary implementation, a storage space of the frame buffer is divided into a plurality of predetermined storage areas.

Step 804: Perform the data processing operation upon a first horizontal line group of the first frame to generate a first processing result, where the data processing operation receives a last horizontal line included in the first horizontal line group prior to receiving a following horizontal line having a line sequence number equal to a line sequence number of a leading horizontal line included in the second horizontal line group.

Step 806: Read the second processing result from the frame buffer at a second time point which is prior to a time point when the data processing operation finishes receiving the first horizontal line group.

Step 808: Buffer the first processing result and store the first processing result into the frame buffer, where storing the first processing result into the frame buffer is started at a first time point which is not prior to the time point when the data processing operation finishes receiving the first horizontal line group.

Figure 9:
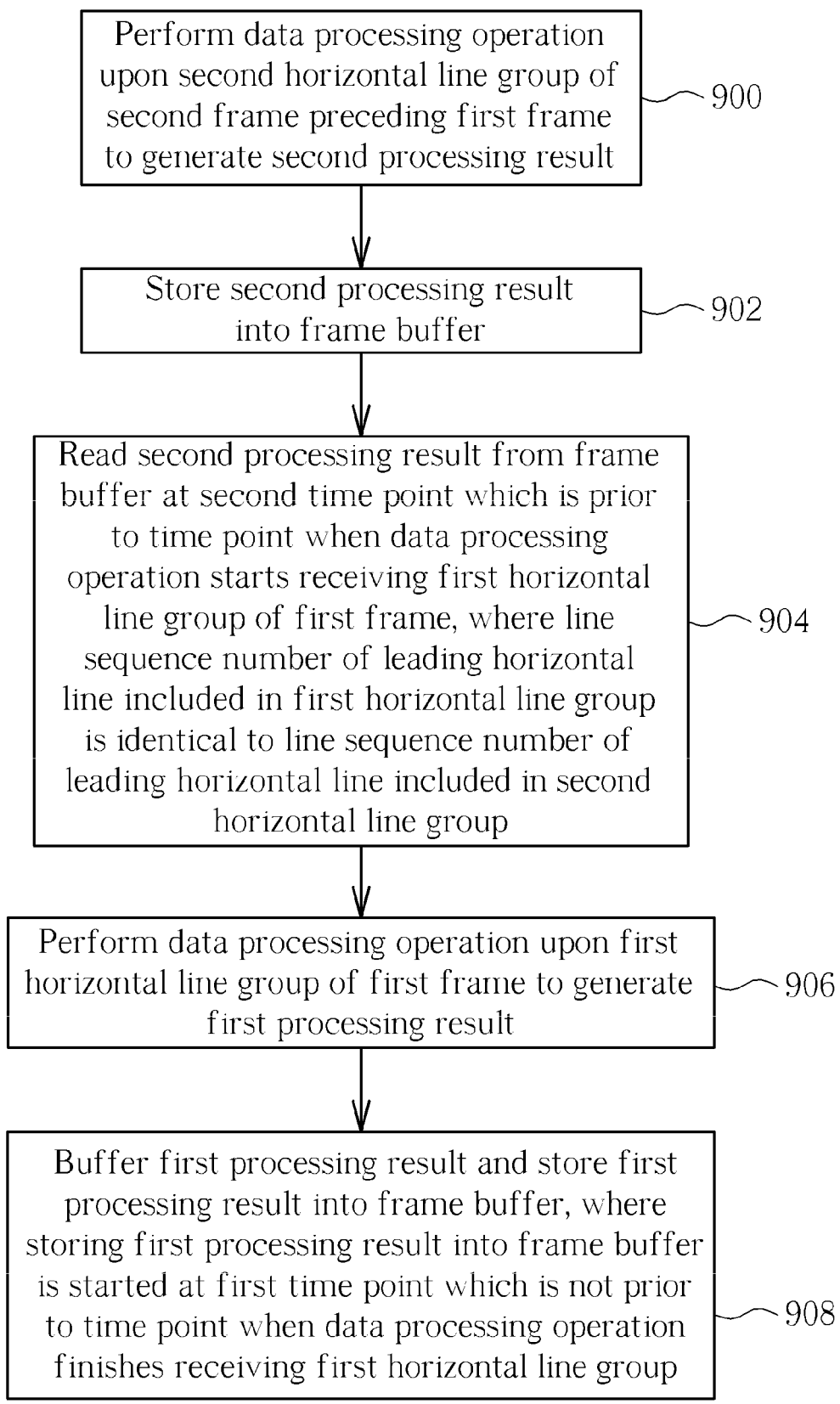
FIG. 9 is a flowchart illustrating another generalized image processing method according to the present invention.

FIG. 9 is a flowchart illustrating another generalized image processing method according to the present invention. The generalized image processing method may be employed by the image data compression apparatuses 100, 600, and 700. Provided that the result is substantially the same, the steps are not required to be executed in the exact order shown in FIG. 9. The exemplary image processing method can be summarized as follows:

Step 900: Perform a data processing operation (e.g., a compression operation) upon a second horizontal line group of a second frame to generate a second processing result, where the second frame (e.g., a previous frame) precedes a first frame (e.g., a current frame).

Step 902: Store the second processing result into a frame buffer. In one exemplary implementation, a storage space of the frame buffer is divided into a plurality of predetermined storage areas.

Step 904: Read the second processing result from the frame buffer at a second time point which is prior to a time point when the data processing operation starts receiving a first horizontal line group of the first frame, where a line sequence number of a leading horizontal line included in the first horizontal line group is identical to a line sequence number of a leading horizontal line included in the second horizontal line group.

Step 906: Perform the data processing operation upon the first horizontal line group of the first frame to generate a first processing result.

Step 908: Buffer the first processing result and store the first processing result into the frame buffer, where storing the first processing result into the frame buffer is started at a first time point which is not prior to a time point when the data processing operation finishes receiving the first horizontal line group.

As a person skilled in the art can readily understand details of the steps shown in FIG. 8 and FIG. 9 after reading above paragraphs directed to the exemplary image processing apparatuses, further description is omitted here for brevity.

Those skilled in the art will readily observe that numerous modifications and alterations of the device and method may be made while retaining the teachings of the invention.

What is claimed is:

1. An image processing apparatus for processing a plurality of successive frames each divided into a plurality of horizontal line groups, each horizontal line group having at least one horizontal line, the image processing apparatus comprising:
a first processing circuit, for processing the horizontal line groups in each frame to generate a plurality of processing results, respectively, wherein a first processing result is generated by processing a first horizontal line group of a first frame, a second processing result is generated by processing a second horizontal line group of a second frame which precedes the first frame, and the first processing circuit receives a last horizontal line included in the first horizontal line group prior to receiving a following horizontal line having a line sequence number equal to a line sequence number of a leading horizontal line included in the second horizontal line group; and
a storage system, comprising:
a frame buffer;
a write circuit, coupled between the first processing circuit and the frame buffer, for buffering the first processing result and storing the first processing result into the frame buffer;
a read circuit, coupled to the frame buffer, for reading the second processing result, stored into the frame buffer by the write circuit, from the frame buffer; and
a timing controller, coupled to the write circuit and the read circuit, for controlling the write circuit to start storing the first processing result into the frame buffer at a first time point which is not prior to a time point when the first processing circuit finishes receiving the first horizontal line group, and controlling the read circuit to start reading the second processing result from the frame buffer at a second time point which is prior to the time point when the first processing circuit finishes receiving the first horizontal line group.

2. The image processing apparatus of claim 1, further comprising:
a second processing circuit, coupled to the read circuit, for performing an inverse data processing operation corresponding to a data processing operation performed by the first processing circuit;
wherein the read circuit further buffers the second processing result read from the frame buffer and outputs the second processing result to the second processing circuit.

3. The image processing apparatus of claim 2, wherein the first processing circuit is a compression circuit and the second processing circuit is a decompression circuit.

4. The image processing apparatus of claim 1, wherein the first time point is identical to the time point when the first processing circuit finishes receiving the first horizontal line group.

5. The image processing apparatus of claim 1, wherein the second time point is a time point when the first processing circuit finishes receiving half of the first horizontal line group.

6. The image processing apparatus of claim 1, wherein a storage space of the frame buffer is divided into a plurality of predetermined storage areas, a total number of the predetermined storage areas is equal to a total number of the horizontal line groups in each frame, and the write circuit stores the processing results of the horizontal line groups in each frame into the predetermined storage areas, respectively.

7. An image processing method for processing a plurality of successive frames each divided into a plurality of horizontal line groups, each horizontal line group having at least one horizontal line, the image processing method comprising:
    performing a data processing operation upon the horizontal line groups in each frame to generate a plurality of processing results, respectively, wherein a first processing result is generated by processing a first horizontal line group of a first frame, a second processing result is generated by processing a second horizontal line group of a second frame which precedes the first frame, and the data processing operation receives a last horizontal line included in the first horizontal line group prior to receiving a following horizontal line having a line sequence number equal to a line sequence number of a leading horizontal line included in the second horizontal line group;
    storing the second processing result into a frame buffer;
    reading the second processing result from the frame buffer at a second time point which is prior to a time point when the data processing operation finishes receiving the first horizontal line group; and
    buffering the first processing result and storing the first processing result into the frame buffer, wherein storing the first processing result into the frame buffer is started at a first time point which is not prior to the time point when the data processing operation finishes receiving the first horizontal line group;
    wherein reading the second processing result from the frame buffer and storing the first processing result into the frame buffer are controlled by a timing controller.

8. The image processing method of claim 7, further comprising:
    performing an inverse data processing operation corresponding to the data processing operation; and
    buffering the second processing result read from the frame buffer and outputting the second processing result to the inverse data processing operation.

9. The image processing method of claim 8, wherein the data processing operation is a compression operation and the inverse data processing operation is a decompression operation.

10. The image processing method of claim 7, wherein the first time point is identical to the time point when the data processing operation finishes receiving the first horizontal line group.

11. The image processing method of claim 7, wherein the second time point is a time point when the data processing operation finishes receiving half of the first horizontal line group.

12. The image processing method of claim 7, further comprising:
    dividing a storage space of the frame buffer into a plurality of predetermined storage areas;
    wherein a total number of the predetermined storage areas is equal to a total number of the horizontal line groups in each frame, and the processing results of the horizontal line groups in each frame are stored into the predetermined storage areas, respectively.

13. An image processing apparatus for processing a plurality of successive frames each divided into a plurality of horizontal line groups, each horizontal line group having at least one horizontal line, the image processing apparatus comprising:
    a first processing circuit, for processing the horizontal line groups in each frame to generate a plurality of processing results, respectively, wherein a first processing result is generated by processing a first horizontal line group of a first frame, a second processing result is generated by processing a second horizontal line group of a second frame which precedes the first frame, and a line sequence number of a leading horizontal line included in the first horizontal line group is identical to a line sequence number of a leading horizontal line included in the second horizontal line group; and
    a storage system, comprising:
        a frame buffer;
        a write circuit, coupled between the first processing circuit and the frame buffer, for buffering the first processing result and storing the first processing result into the frame buffer;
        a read circuit, coupled to the frame buffer, for reading the second processing result, stored into the frame buffer by the write circuit, from the frame buffer; and
        a timing controller, coupled to the write circuit and the read circuit, for controlling the write circuit to start storing the first processing result into the frame buffer at a first time point which is not prior to a time point when the first processing circuit finishes receiving the first horizontal line group, and controlling the read circuit to start reading the second processing result from the frame buffer at a second time point which is prior to a time point when the first processing circuit starts receiving the first horizontal line group.

14. The image processing apparatus of claim 13, further comprising:
    a second processing circuit, coupled to the read circuit, for performing an inverse data processing operation corresponding to a data processing operation performed by the first processing circuit;
    wherein the read circuit further buffers the second processing result read from the frame buffer and outputs the second processing result to the second processing circuit.

15. The image processing apparatus of claim 14, wherein the first processing circuit is a compression circuit and the second processing circuit is a decompression circuit.

16. The image processing apparatus of claim 13, wherein a storage space of the frame buffer is divided into a plurality of predetermined storage areas, a total number of the predetermined storage areas is equal to a total number of the horizontal line groups in each frame, and the write circuit stores the processing results of the horizontal line groups in each frame into the predetermined storage areas, respectively.

17. An image processing method for processing a plurality of successive frames each divided into a plurality of horizontal line groups, each horizontal line group having at least one horizontal line, the image processing method comprising:

performing a data processing operation upon the horizontal line groups in each frame to generate a plurality of processing results, respectively, wherein a first processing result is generated by processing a first horizontal line group of a first frame, a second processing result is generated by processing a second horizontal line group of a second frame which precedes the first frame, and a line sequence number of a leading horizontal line included in the first horizontal line group is identical to a line sequence number of a leading horizontal line included in the second horizontal line group;

storing the second processing result into a frame buffer;

reading the second processing result from the frame buffer at a second time point which is prior to a time point when the data processing operation starts receiving the first horizontal line group; and buffering the first processing result and storing the first processing result into the frame buffer, wherein storing the first processing result into the frame buffer is started at a first time point which is not prior to a time point when the data processing operation finishes receiving the first horizontal line group;

wherein reading the second processing result from the frame buffer and storing the first processing result into the frame buffer are controlled by a timing controller.

18. The image processing method of claim 17, further comprising:

performing an inverse data processing operation corresponding to the data processing operation; and buffering the second processing result read from the frame buffer and outputting the second processing result to the inverse data processing operation.

19. The image processing method of claim 18, wherein the data processing operation is a compression operation and the inverse data processing operation is a decompression operation.

20. The image processing method of claim 17, further comprising:

dividing a storage space of the frame buffer into a plurality of predetermined storage areas;

wherein a total number of the predetermined storage areas is equal to a total number of the horizontal line groups in each frame, and the processing results of the horizontal line groups in each frame are stored into the predetermined storage areas, respectively.

* * * * *